(12) United States Patent
Akhtar et al.

(10) Patent No.: US 12,440,354 B2
(45) Date of Patent: Oct. 14, 2025

(54) SYSTEM AND METHOD FOR AN ADVANCED PROSTHETIC HAND

(71) Applicant: PSYONIC, Inc., Champaign, IL (US)

(72) Inventors: Aadeel Akhtar, Urbana, IL (US); James Alastar Austin, Champaign, IL (US); Jesse Michael Cornman, Champaign, IL (US); Dhipak Murthy Bala, Urbana, IL (US); Zipeng Wang, Hebei (CN)

(73) Assignee: PSYONIC, Inc., Champaign, IL (US)

( * ) Notice: Subject to any disclaimer, the term of this patent is extended or adjusted under 35 U.S.C. 154(b) by 25 days.

(21) Appl. No.: 17/030,099

(22) Filed: Sep. 23, 2020

(65) Prior Publication Data

US 2021/0085491 A1    Mar. 25, 2021

Related U.S. Application Data

(60) Provisional application No. 62/904,483, filed on Sep. 23, 2019.

(51) Int. Cl.
*A61F 2/72* (2006.01)
*A61F 2/50* (2006.01)
(Continued)

(52) U.S. Cl.
CPC .......... *A61F 2/586* (2013.01); *A61F 2/5046* (2013.01); *A61F 2/583* (2013.01); *A61F 2/72* (2013.01);
(Continued)

(58) Field of Classification Search
CPC ....... A61F 2002/5058–5064; A61F 2002/6827
See application file for complete search history.

(56) References Cited

U.S. PATENT DOCUMENTS

| | | | |
|---|---|---|---|
| 4,143,426 A | | 3/1979 | Hall et al. |
| 4,685,929 A | * | 8/1987 | Monestier ............... A61F 2/583 |
| | | | 623/64 |

(Continued)

FOREIGN PATENT DOCUMENTS

| | | | |
|---|---|---|---|
| DE | 327490 C | 10/1920 | |
| EP | 2 890 333 B1 | * 12/2016 | ............. A61F 2/583 |

(Continued)

OTHER PUBLICATIONS

Translation of DE327490-C (Year: 1916).

*Primary Examiner* — David H Willse
(74) *Attorney, Agent, or Firm* — Alpine Patents LLC; Brian Van Osdol

(57) ABSTRACT

A system and method for creation and function of an advanced prosthetic hand includes: a base palm, comprising the primary body of the prosthetic hand; a set of actuating digits, wherein each actuating digit is connected to the palm; a sleeve, connected to the palm, providing an interface; a sensor system, comprising sensors integrated on a subset of the set of actuating digits; and a feedback system, connected to the sensor system enabling sensory feedback from the sensor system. In preferred variations, the base palm comprises, at least partially, a carbon-fiber shell. The system may further include a set of water sealing elements integrated into the prosthetic hand. The system functions as a hand prosthesis with actuating digit and hand components.

15 Claims, 19 Drawing Sheets

(51) Int. Cl.
*A61F 2/54* (2006.01)
*A61F 2/58* (2006.01)
*A61F 2/70* (2006.01)
*A61F 2/68* (2006.01)
*A61F 2/76* (2006.01)

(52) U.S. Cl.
CPC . *A61F 2002/501* (2013.01); *A61F 2002/5053* (2013.01); *A61F 2002/5055* (2013.01); *A61F 2002/5061* (2013.01); *A61F 2002/5066* (2013.01); *A61F 2002/5089* (2013.01); *A61F 2002/587* (2013.01); *A61F 2002/6827* (2013.01); *A61F 2002/6863* (2013.01); *A61F 2002/701* (2013.01); *A61F 2002/704* (2013.01); *A61F 2002/7635* (2013.01)

(56) References Cited

U.S. PATENT DOCUMENTS

| | | |
|---|---|---|
| 11,185,427 B2 | 11/2021 | Akhtar et al. |
| 2005/0021154 A1 | 1/2005 | Brimalm |
| 2010/0036507 A1 | 2/2010 | Gow |
| 2010/0082103 A1 | 4/2010 | Blunn et al. |
| 2011/0054636 A1* | 3/2011 | Gill ................... A61F 2/583 156/305 |
| 2011/0160873 A1 | 6/2011 | Jaworski |
| 2013/0053984 A1 | 2/2013 | Hunter et al. |
| 2014/0277588 A1* | 9/2014 | Patt ................... A61F 2/586 623/57 |
| 2014/0277589 A1 | 9/2014 | Veatch |
| 2015/0230941 A1 | 8/2015 | Jury |
| 2016/0250015 A1* | 9/2016 | Kim ................... A61F 2/105 623/15.12 |
| 2017/0007424 A1 | 1/2017 | Gill |
| 2017/0020691 A1 | 1/2017 | Thompson et al. |
| 2017/0348117 A1* | 12/2017 | Strbac ................ A61F 2/583 |
| 2019/0000649 A1* | 1/2019 | Perry ................. A61F 2/54 |
| 2019/0328550 A1 | 10/2019 | Akhtar et al. |
| 2020/0306059 A1 | 10/2020 | Cornman et al. |
| 2021/0293643 A1* | 9/2021 | Correll ............... A61F 2/54 |

FOREIGN PATENT DOCUMENTS

| | | | |
|---|---|---|---|
| GB | 2488760 A | 9/2022 | |
| KR | 10-2019-0023402 A | * 3/2019 | ............. A61F 2/583 |
| WO | WO 2015/193856 A1 | * 12/2015 | ............... A61F 2/68 |

\* cited by examiner

Printing a negative mold S110

Casting an intermediary mold S120

Creating a production mold S130

Shaping the prosthetic hand component from a base material S140

Finishing the prosthetic hand component S150

FIGURE 11

SYSTEM AND METHOD FOR AN ADVANCED PROSTHETIC HAND

CROSS-REFERENCE TO RELATED APPLICATIONS

This Application claims the benefit of U.S. Provisional Application No. 62/904,483, filed on 23-SEP 2019, which is incorporated in its entirety by this reference.

TECHNICAL FIELD

This invention relates generally to the field of bionic prosthetics, and more specifically to a new and useful system and method for an advanced prosthetic hand.

BACKGROUND

A bionic electromechanical prosthesis can be incredibly empowering to individuals with limb differences. In particular, a bionic prosthetic hand can grant a user an actuating hand to grasp, hold, and interact with the world.

Unfortunately, many advanced prosthetic hands can be very expensive. In addition to the high financial burden, many prosthetic hands are not robust—they are susceptible to breaking and they lack strength to handle large loads. Furthermore, a prosthesis may be heavy which detracts from the comfort and usability of the prosthesis to the user.

Commercially available hands also widely lack sensing capabilities and in particular pressure sensitive touch feedback. Thus, there is a need in the bionic prosthetics field to create a new and useful system and method for an advanced prosthetic hand. This invention provides such a new and useful system and method.

BRIEF DESCRIPTION OF THE FIGURES

FIG. 11 is a flow diagram of a method of a preferred embodiment;

DESCRIPTION OF THE EMBODIMENTS

The following description of the embodiments of the invention is not intended to limit the invention to these embodiments but rather to enable a person skilled in the art to make and use this invention.

1. Overview

A system and method for an advanced prosthetic hand of a preferred embodiment functions to provide a robust, water-resistant, and intelligent electromechanical prosthetic hand. The system and method presented herein set forth system designs, and methods of manufacturing and operation that can be applied to bring unique and useful capabilities to a prosthetic hand. The system and method can be used in creating carbon-fiber reinforced parts, waterproofing the prosthetic hand, integrating multiple sensors and feedback systems, and/or enabling other capabilities.

Figure 1:
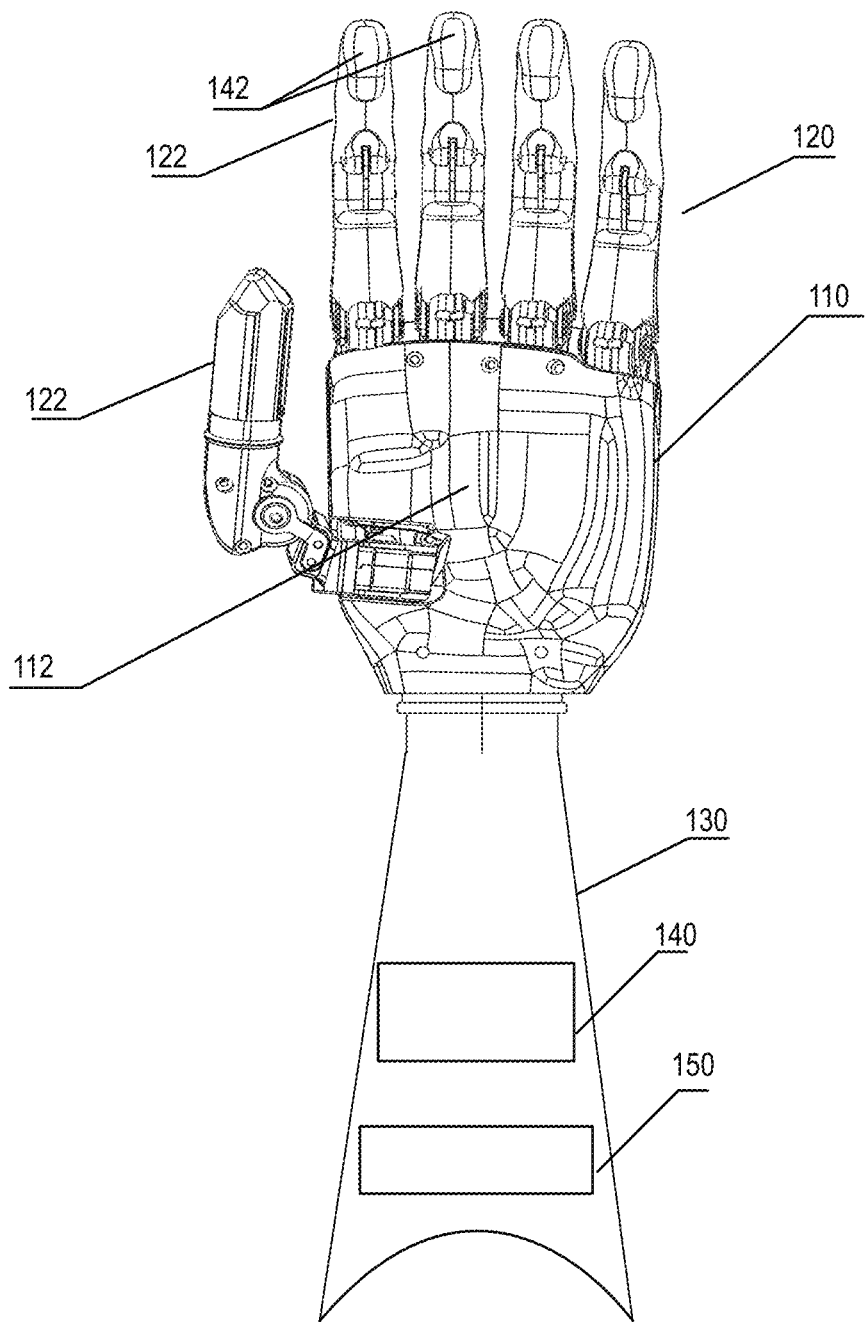
FIG. 1 is a schematic representation of a system of a preferred embodiment.

As shown in FIG. 1, a system and method for an advanced prosthetic hand can include a base palm, the palm body including a carbon-fiber shell, a set of five actuating digits (fingers and thumb) connected to the palm body, a set of water sealing elements integrated into the hand, a tactile sensor system integrated into and on each actuating digit, and a feedback system providing sensory feedback from the sensor system. The prosthetic hand is a bionic hand with six degrees of freedom, where five digit elements can be actuated for flexion/extension about a joint, plus an additional degree of freedom for one of the digits such as rotation of a thumb-digit element. In some variations, the system may comprise a subset of the elements described herein. For example, the carbon-fiber shell, water sealing elements, and/or sensor system may optionally be integrated into the prosthetic hand in any suitable combination.

The prosthetic hand components (e.g. palm and digits) are preferably created through a process of 3D printing a negative mold of each component, casting an intermediary mold of the negative mold, then creating a production mold from the intermediary mold. The production mold is then used in shaping the prosthetic component from carbon-fiber, silicone, and/or any other desired compound. A method for an advanced prosthetic hand can include methods for encasing a prosthesis with carbon-fiber, sealing components of the prosthetic hand, and integrating a touch sensor system.

The system and method and their respective subcomponents or a combination of subcomponents are not limited to a bionic hand prosthesis. The techniques and variations of the system and method described herein may alternatively and/or additionally be applied in other fields such as robotics, automated mechanisms, or any suitable application needing an actuating limb, lever, or mechanism.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method may be used to create a prosthetic hand with enhanced strength. The carbon-fiber reinforcement of the palm and optional use of compliant finger joints can, in some exemplary implementations, enable a finger to hold at least 38 pounds and an assembled hand to hold at least 50 pounds. The enhanced strength of the prosthetic hand can be achieved while the system weighs a comparable amount or less to a standard but less capable prosthetic hand. Furthermore, the prosthetic hand preferably makes use of a carbon-fiber body, which facilitates enhanced strength and reduction in weight.

As a related potential benefit, the system and method may include enhanced mechanical compliance making the prosthesis resilient to impact and abuse. The bionic hand can include fingers with compliant joints that can be designed to absorb energy on impact so that they give rather than break.

As another potential benefit, the system and method can be water-resistant and/or waterproof within a range of everyday operating conditions. The prosthetic hand includes waterproofing elements integrated into the physical design of the system such that water and/or fluids can be substantially prevented in a range of usage conditions.

As another potential benefit, the system and method can include integrated touch sensing capabilities. The unique mechanical design can incorporate a touch or pressure sensor into the digits. Touch sensing capabilities can be integrated into the prosthetic hand.

As yet another potential benefit, the system and method may produce a superior bionic prosthetic hand across a number of performance metrics while minimizing device cost such that the hand is more affordable.

2. System

Figure 2:
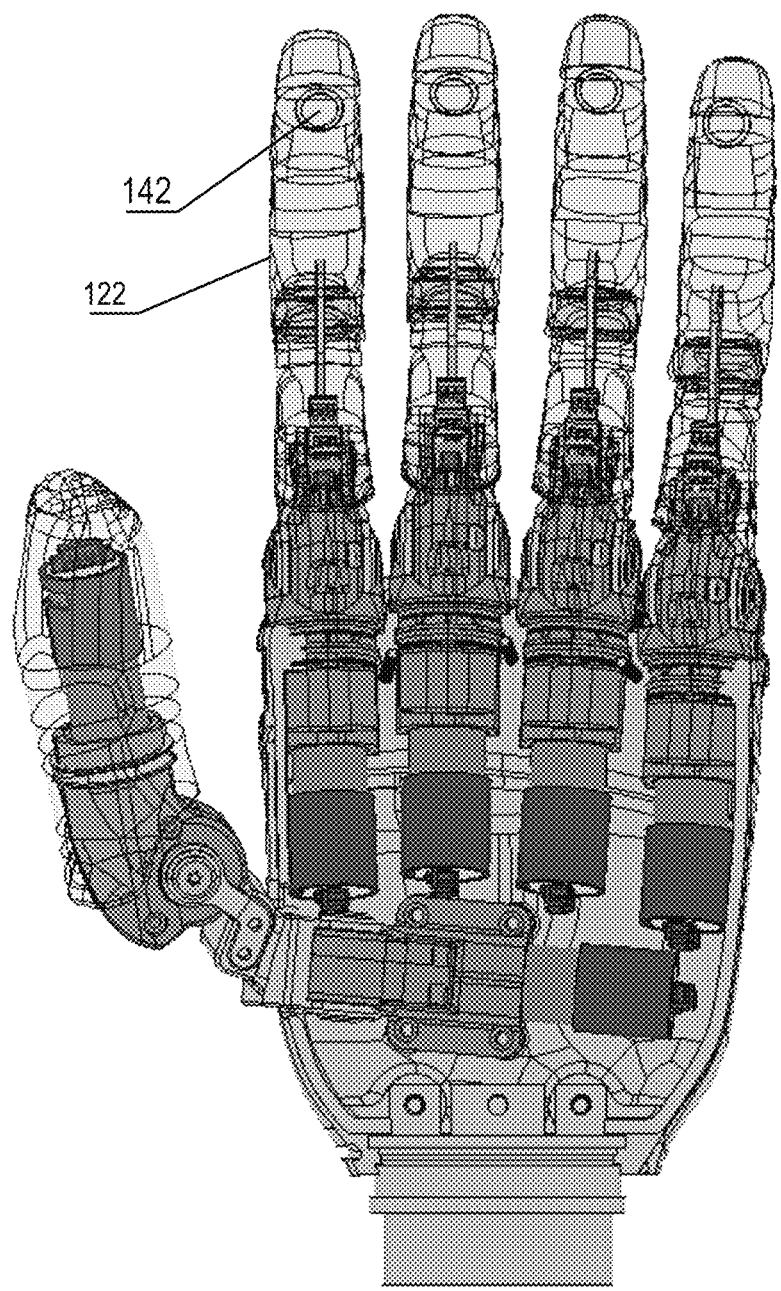
FIG. 2 is a schematic representation of a system of a preferred embodiment.

As shown in FIGS. 1 and 2, a system for an advanced prosthetic hand includes: a base palm 110, comprising the primary body of the prosthetic hand; a set of actuating digits 120, wherein each actuating digit 122 is connected to the palm; a sleeve 130, connected to the palm, providing an interface; a sensor system 140, comprising sensors 142 integrated on a subset of the set of actuating digits; and a feedback system 150, connected to the sensor system enabling sensory feedback from the sensor system. In preferred variations, the base palm comprises, at least partially, a carbon-fiber shell 112. The system may further include a set of water sealing elements integrated into the prosthetic hand. The system functions as a hand prosthesis with actuating digits and hand components.

The base palm 110 functions as a central body element of the prosthesis, such that each actuating digit from the set of actuating digits connects directly to the palm. The palm 110 may additionally interface/connect with other components, e.g. the sleeve or an arm socket. The palm 110 preferably includes a structural form that approximates the shape, form and dimensions of a human hand. Alternatively, other forms may be used (e.g. animal hand or paw).

The palm 110 may be composed of many elements. In some preferred variations, the palm 110 composition includes a carbon-fiber shell encasing an internal substructure. The carbon-fiber shell of the palm 110 may provide structural durability to the hand. Preferably, the palm 110 is a substantially rigid and sufficiently strong element to enable such that large static compressive loads (e.g. 150 pounds) can be supported by the structure.

The palm 110 may comprise a body created as a single body (i.e. unibody), or constructed of multiple combined components (i.e. multibody). As part of a multibody construction, palm 110 components may comprise single, or multiple layers of portions of the palm 110 (e.g. layers of lateral, frontal, etc. facings). In one preferred variation of a multibody palm 110 design, two or more body elements are attached together. For example, two body elements can be fixed together (e.g., fastened with screws, snap-locked, adhered, etc.). A first body element may form the "palm facing" portion of the palm 110, i.e. the portion of the palm comprising the face that the fingers bend towards. Additionally, a second body element may form the "back of the hand" portion of the palm 110. Alternatively, any suitable division and number of body elements may be used (e.g. finger proximal region of the hand and wrist proximal region of the hand).

Additionally or alternatively, the palm 110 may comprise interior/exterior layers for added support or other functionalities. In some variations, the palm 110 includes a carbon-fiber shell. Carbon-fiber materials generally have attributes of high stiffness, high tensile strength, low weight, high temperature tolerance and low thermal expansion. In effect the use of carbon-fiber in the palm 110 can reduce the weight while being a strong rigid material. As part of the two-body palm 110 implementation, the carbon-fiber may comprise an interior or exterior layer of both the first body element and the second body element. Alternatively, the carbon-fiber may comprise an interior or exterior element of just the first body element or the second body element.

In one example, the carbon-fiber shell comprises the outer casing of the palm 110. The carbon-fiber shell functions to provide an outer casing that increases the strength of the palm 110. Additionally, the outer casing carbon-fiber shell may provide additional resistance to blunt and sharp impacts to the prosthetic hand.

In other variations, the carbon-fiber shell comprises a layer of the hand that is not the most exterior. For example, the carbon-fiber shell may comprise the penultimate exterior layer (or further interior layer), and the palm 110 may further include an additional layer or layers, i.e. a more "functional" layer. In these variations, the carbon-fiber shell may still provide strength and resistance to the prosthetic hand, wherein the "functional" layer may provide specialized, or improved functionality to the prosthetic hand. Examples of the functional layers include: a material layer with a high coefficient of friction to provide stronger grip (e.g. textured silicone), a material layer with a low coefficient of friction for improved object manipulation (e.g. Teflon), or a layer that better physically and/or visually imitates a living hand (e.g. silicone or soft plastic polymer that looks and feels like a human hand).

The carbon-fiber shell is preferably composed of prepreg carbon-fiber molded to the form of an internal substructure and adhered to the surface of the internal substructure. The carbon-fiber shell may additionally be finished with a coating such as 2 k urethane clear coat but any suitable coating or finish may be applied. Prepreg carbon-fiber is a carbon-fiber weave pre-impregnated with resin epoxy or another suitable type of adhesive. Alternatively, a non-prepreg carbon-fiber material can be impregnated or treated with a resin epoxy or otherwise adhered and integrated onto an internal substructure.

The internal substructure of the palm 110 functions to provide structural form to the carbon-fiber shell. The internal substructure is preferably a three-dimensional frame. The internal substructure can be a 3D-printed solid part(s). The internal substructure may alternatively be manufactured through any suitable approach (e.g., milling, casting, etc.). The internal substructure preferably forms a frame defining the structural form.

The internal substructure may additionally define an internal cavity (or cavities) and internal component-holding elements. A defined internal cavity is preferably defined to contain or hold electronic elements, electromechanical elements, and/or other components of the hand. The holding elements may be defined structures to facilitate fastening or otherwise mounting elements within the internal substructure. The internal substructure can include fastening elements that function to facilitate mounting elements to the internal substructure and/or for fastening together body elements. The fastening elements may include elements such as screw through-holes, threaded holes, or snap-lock clasps, and/or other suitable elements. For example, a number of screw mounting holes can be defined within a palm 110 and back of hand internal substructures that can be fastened together.

The internal substructure preferably includes a structural adhesion surface on the outer surface of the internal substructure, which functions to provide improved attachment of the carbon-fiber shell to the internal substructure. The structural adhesion surface can include any structural element of the internal substructure that will be contacted with the carbon-fiber shell. At least a sub-portion of such surfaces has a structural adhesion surface to which the carbon-fiber shell can adhere. In one variation, substantially all (e.g., greater than 80% of the surface covered by the carbon-fiber shell) is a structural adhesion surface of the internal substructure. The internal substructure may include defined cavities wherein the carbon-fiber shell bridges across the defined cavities when adhered to the internal substructure thereby enclosing the defined cavities.

The palm 110 may house internal circuitry, such as motors, electronic and electromechanical system elements, computational system elements, sensors, batteries, communication modules, and wiring. In preferred variations, the palm 110, the arm socket element and/or the sleeve, are used in housing a portion of the internal circuitry. In addition to other functionalities, internal circuitry may function to control and actuate prosthetic hand components.

In one implementation, the palm 110 may house internal circuitry used to actuate prosthetic hand components. Preferably, the palm 110 includes a set of actuation systems, each dedicated to and interfacing with a finger element. The actuation systems can be a variety of types of actuation systems. More specifically, the palm 110 body may house or interface with a set of drivetrains used in actuating the set of actuating digits. In one preferred variation, the drivetrains include a worm gear system encased within a water-sealed casing.

The set of actuating digits 120 functions as moving prosthetic fingers and thumb. Any suitable number of actuating digits may be included as part of the system. Preferably, the set of actuating digits 120 corresponds to the human hand with a thumb digit, offset to one side, and four finger digits interfacing with the palm 110. Preferably, each actuating digit 122, from the set of actuating digits 122, is directly connected to the palm 110. Herein, the four finger digits may generally be referred to as primary fingers or finger digits and the thumb digit may be referred to as the thumb or the thumb digit. The primary fingers can be distinct in size to more accurately reflect the fingers of a human hand (e.g. index digit, middle digit, ring digit, and pinky digit). Thus, in some variations, the set of actuating digits 120 comprises five distinct actuating fingers 122. In preferred variations for a human prosthetic hand these actuating digits 122 comprise: a thumb digit and four distinct finger digits. Alternatively, the primary fingers may be substantially similar in size and shape, which can function to minimize part count and design complexity. Similarly, the thumb digit can be substantially similar in size and shape to the primary fingers. Alternatively, the thumb may be of different size and/or shape as compared to the primary fingers.

The primary fingers of the set of actuating digits 120 preferably comprise an actuating four-bar linkage mechanism, wherein each finger can be actuated and driven from a joint at the interface between the finger and the palm 110. Actuating the drive joint thereby drives actuation at an intermediary joint in the actuated finger. Use of the four-bar linkage mechanism functions to approximate a finger flexing motion, using only a single electromechanical actuator. Alternatively or additionally, multiple actuated degrees of freedom may be integrated into the finger. An actuated finger is preferably driven by a drive train, which could be a worm gear drive system, integrated and housed within the palm 110. Alternative implementations can house the drive train in the interface of the palm 110, in a finger interface, or on the actuating digits 122.

The thumb digit preferably includes two degrees of freedom, to better approximate the more dynamic articulation of the human thumb. In one preferred variation, the thumb digit includes one degree of freedom that is rotation about its axis at or near the interface between the palm 110 and the thumb. The thumb digit may rotate within any suitable range of angular motion (e.g. rotating across a 180 degrees range). A second degree of freedom can be a flexing degree of freedom. The thumb may house a motor that actuates a single flexion joint. In one preferred implementation, a drive train housed in the palm drives one actuation point of the thumb and a drive train housed in the distal end of the thumb drives a second actuation point.

Passive or compliant joints may be integrated into one or multiple actuating digits 122. A passive or compliant joint may be a defined degree of freedom of a finger when encountering external force. For example, a passive distal phalanx joint (e.g., a joint approximating the last knuckle of a finger) may not be actuated but can flex with a limited range of angular motion when the actuating digit 122 encounters an outside force (e.g., when pressing on an object or when an object is pressing on the actuating digit 122).

In one preferred variation, at least one actuating digit 122 is a compliant finger wherein the compliant finger includes a compliant four-bar linkage mechanism. In one preferred implementation, the compliant four-bar linkage mechanism is substantially similar to the one disclosed in U.S. patent application Ser. No. 16/397,457, filed on 29 Apr. 2019, which is hereby incorporated in its entirety by this reference.

The compliant four-bar linkage mechanism of a preferred embodiment includes: a compliant monolithic bone structure, comprising at least two segments integrated through a compliant joint; at least two link components; and at least three joint components; wherein the monolithic finger bone and the at least two link components are connected through the at least three joint components. In one implementation comprising two link components and three joints, the monolithic bone structure and the two link components all interconnect through the three joints. In cooperation with the compliant joint of the monolithic bone structure, these components combine to functionally form a compliant four-bar linkage. The compliant four-bar linkage mechanism functions to make a mechanism with a range of motion comparable to a four-bar linkage mechanism that is additionally resilient to incidental forces outside of the intended range of motion.

In the context of the prosthetic hand, the compliant joint may alternatively be described in terms of biological descriptors of the mechanical joints. Accordingly, the system may alternatively be described as a system for a prosthetic finger that includes: a monolithic bone structure comprised of a compliant proximal interphalangeal joint and an input link segment and a coupler link segment, wherein the input link segment and the coupler link segment are connected through the compliant proximal interphalangeal joint; an output link; and a prosthetic hand structure. Wherein the monolithic bone structure, output link, and the prosthetic hand structure are connected through a set of joints in a configuration of a compliant four-bar linkage mechanism which comprises: the output link on a first end and the coupler link segment connected through an output joint, the output link on a second end connected to a ground joint on the prosthetic hand structure, and the monolithic bone structure connected to a metacarpophalangeal input joint connected to the prosthetic hand structure. In some implementations the metacarpophalangeal input joint can be torsionally compliant. This variation may similarly include an actuation input coupled to the metacarpophalangeal input joint. Additionally, the monolithic bone structure may additionally include a fingertip section extending from the coupler segment. The fingertip section can include two segments connected through a compliant distal interphalangeal joint.

The compliant four bar linkage mechanism functions to provide a mechanism for planar actuation of the finger joint—preferably for a robotic/prosthetic finger. The robotic finger is preferably incorporated as part of the prosthetic hand. More specifically, the compliant four-bar linkage mechanism may function to convert an input crank motion of a motor (e.g. housed within the palm 110) to bending actuation of the robotic finger. The compliant four-bar linkage mechanism may alternatively be implemented for bending actuation of other artificial bodies (e.g. mechanical/robotic/prosthetic, finger, hand, arm, knee, leg, neck). In preferred variations for the robotic finger of a prosthetic hand, the compliant four-bar linkage may additionally function to increase structural integrity of the robotic finger, as compared to a rigid conventional four-bar linkage, making the prosthetic hand more impact resistant.

Figure 3:
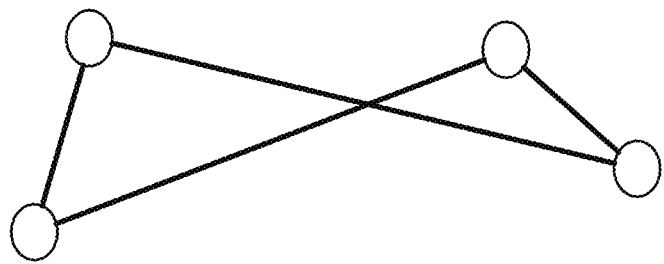
FIG. 3 is a schematic representation of a four-bar linkage mechanism.
Figure 4:
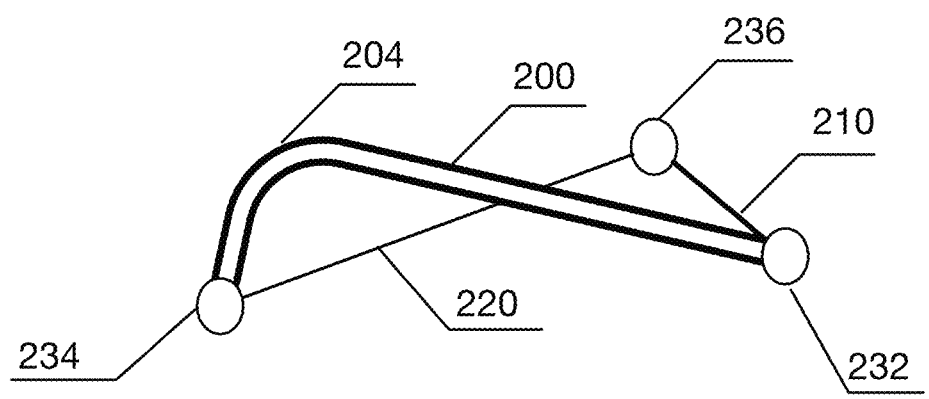
FIG. 4 is a schematic representation of compliant four-bar linkage mechanisms.

The compliant finger four-bar linkage mechanism preferably has the functional capability of a conventional four-bar linkage. As compared to the conventional four-bar linkage, the four-bar linkage section of the monolithic bone may functionally replace a rigid input link, a rigid coupler link (also referred to as a floating link) and a connecting revolute joint (typically a pin joint) of the conventional four-bar linkage. Additionally, a follower link (also called output link) of the conventional four-bar linkage may be replaced with one or more layers of spring steel. The system preferably has the functionality of the conventional four-bar linkage with the added benefit of lateral compliance and elimination of a pivot joint between the input link and the coupler link of the conventional four-bar linkage (which is a major site of failure of impact for traditional prosthetic hands). As shown in FIG. 3, a conventional four-bar linkage will traditionally include four revolute pin joints and four rigid links, which may then be compared to the compliant finger four-bar linkage schematic shown in FIG. 4. As shown in FIG. 4, the system promotes a linkage mechanism composed of three linking structures: the ground link 210, the output link 220, and the compliant link 200. The linkage structures connect the set of joints, wherein the drive joint 232 connects the compliant link to the ground link 210, the output joint 234 connects the compliant link 200 to the output link 220, and a ground joint 236 connects the ground link 210 to the output link 220. The compliant link 200, however, incorporates at least one compliant joint 204 into the structure of the compliant link 200. The compliant joint 204 has a flexible range such that the three linking structures actuate in a motion comparable to a four-bar linkage usable in a prosthetic finger as shown in the model example of FIGS. 5 and 6.

Figure 5:
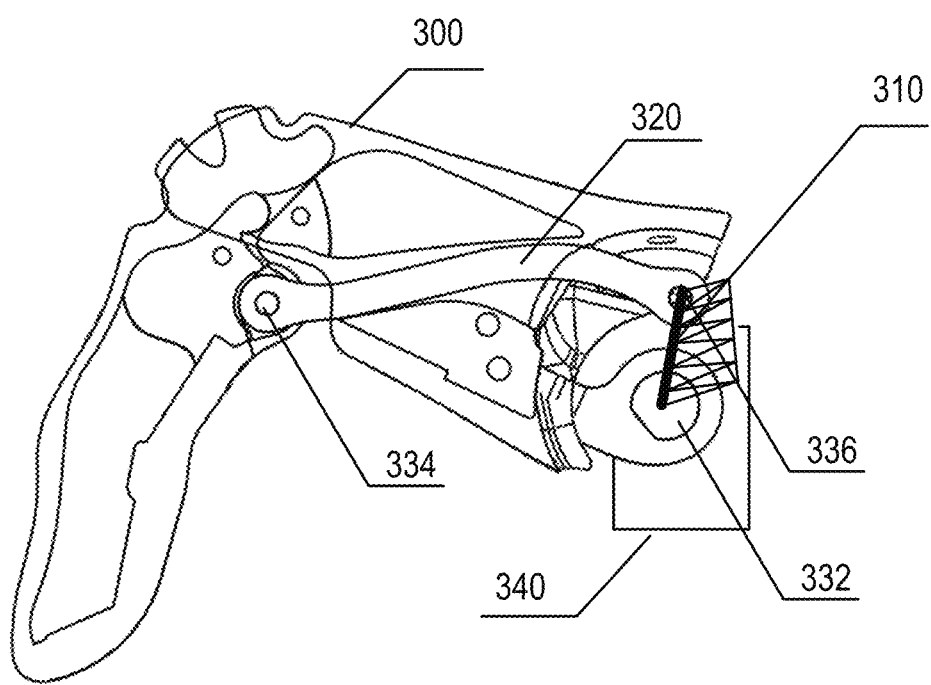
FIGS. 5 and 6 are schematic representations of an actuating digit of a preferred embodiment.
Figure 6:
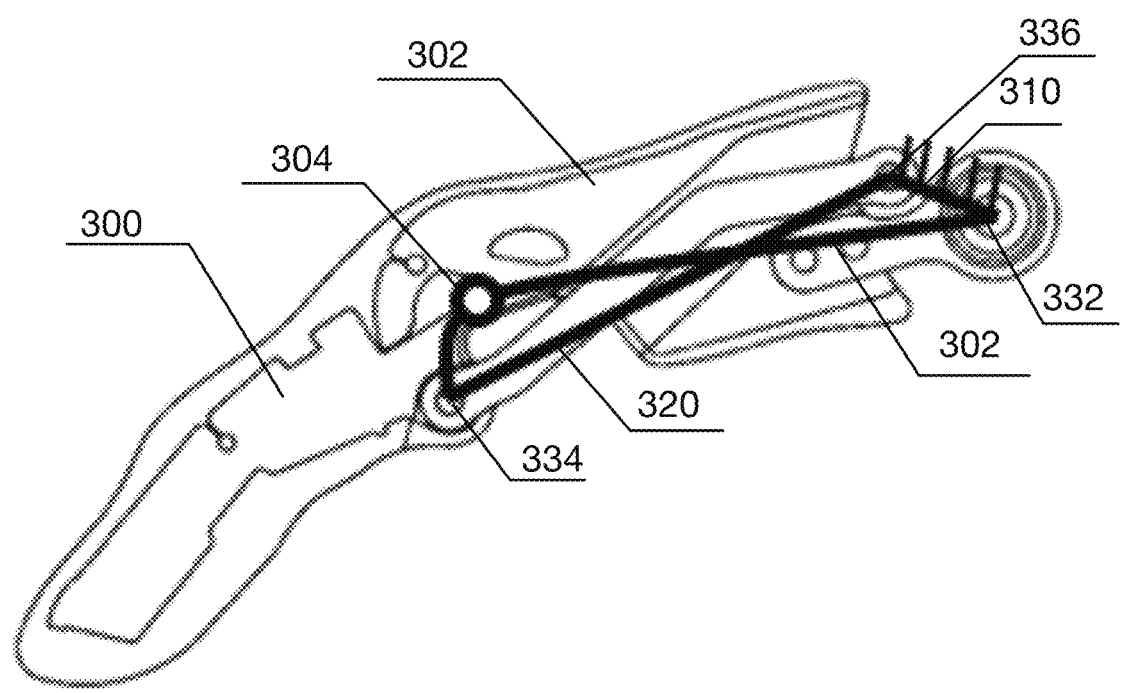

As shown in FIGS. 5 and 6, one variation of an actuating digit 122 of the prosthetic hand comprising a compliant four-bar linkage mechanism includes a monolithic bone 300, a ground link 310, an output link 320, and a set of joints, wherein a drive joint 332 connects the monolithic bone to the ground link 310, an output joint 334 connects the monolithic bone 300 to the output link 320, and a ground joint 336 connects the ground link 310 to the output link 320. The monolithic bone 300 is preferably a compliant multi-segment structure that includes a four-bar linkage section 302. More specifically, the actuating digit may include a monolithic bone structure comprising a compliant joint region and an input link segment and a coupler link segment, wherein the input link segment and the coupler link segment are connected through the compliant joint; an output link; and a ground structure. The monolithic bone structure, output link and ground structure are preferably connected through a set of joints in a configuration of a compliant four-bar linkage mechanism which comprises: the output link 320 on a first end and the coupler link segment connected through a output joint 334 (i.e., coupler joint), the output link 320 on a second end connected to a ground joint 310 on the ground structure, and the monolithic bone structure connected to an input joint connected to the ground structure. As part of the prosthetic hand, the actuating digit 122 preferably includes an actuation input 340 coupled to the input joint.

The actuating digit 122 is preferably a subsystem composed of multiple parts. In the example of the four-bar linkage mechanism, the actuating digit 122 may include linkage structures joined together through a joint or hinge connected to the palm. Furthermore, the actuation input 340 may comprise direct, or indirect, coupling to a motor in the palm 110 of the prosthetic hand. Thus, through input from the motor, the actuating digit 122 may bend/contract with respect to the palm 110.

As part of the prosthetic hand, the actuating digit 122 may further connect and/or include additional components. In some variations, the system and method may incorporate additional joint and link components, sensors, actuated elements, and/or other features. As a prosthetic finger, the actuating digit 122 may further include an outer layer(s). In some variations, the actuating digit 122 may additionally include an outer skin(s) or coating(s). Each actuating digit 122 may comprise the same or distinct outer skin(s) and/or coating(s) as desired. As per the palm 110, the outer skins or coatings may provide desired functionalities. Examples of outer skins include: a carbon-fiber shell, to provide strength and resistance; a material layer with a high coefficient of friction to provide stronger grip, a material layer with a low coefficient of friction for improved object manipulation (e.g. Teflon); a layer that better physically and/or visually imitates a living hand; and/or a malleable layer to enable embedding of components within the digit (e.g. silicone).

In one preferred example, at least one actuating digit 122 comprises a silicone outer skin. The silicone outer skin may enable integration of sensors within the actuating digit 122. The silicone outer skin may be molded around a "core bone" structure of the actuating digit 122.

The system and method may additionally incorporate mechanism design considerations that may function to enhance the manufacturability and assembly of the set of actuating digits 120. For example, the system and method may be suitable for leveraging three-dimensional (3D) printing of one or more components.

The system of a preferred embodiment includes a sleeve 130. The sleeve 130 functions as a connecting interface between the prosthetic hand and a user. Additionally, the sleeve 130 may provide a housing for other system components. The sleeve may connect directly to the palm 110 of the prosthetic hand and provide an adjustable interface for connection/wearing of the prosthetic hand by a user. The sleeve is preferably a shell structure. Accordingly, the sleeve 130 may include a defined recessed cavity. The sleeve 130 is preferably substantially rigid. In some variations, the sleeve 130 may additionally include an external carbon-fiber shell. Padding and other elements can be integrated into the defined recessed cavity to increase comfort for the user and provide better storage capability.

In implementations of the system as a prosthetic limb replacement, the sleeve 130 may comprise a limb socket (i.e. arm socket) such that sleeve interfaces between the residual limb of a user and the prosthetic hand or more specifically the palm 110. In an arm socket implementation, the socket may be designed to fit over the user's residual limb. Alternatively, the sleeve 130 may be strapped to the residual limb, or attached to the residual limb in any other fashion.

As a residual limb interface, the sleeve may function as a customizable component to optimize the prosthetic hand functionality for a user. That is, in some variations, the length and angle of the sleeve 130 may be adjusted such that the prosthetic hand has an optimally desirable positioning for utilization by the user. In some variations, the sleeve may enable changing of weight distribution of the prosthetic hand for greater comfort. That is, weight may be added or removed from distinct regions of the sleeve 130 to better balance the prosthetic hand.

Additionally, in some variations, one or more degrees of freedom may exist between the palm 110. In one variation, a rotational degree of freedom in a wrist-region where the palm 110 interfaces with the arm socket element enables rotation of the prosthetic hand with respect to the user. In another variation, a multi-degree of freedom actuator may allow the palm body to be actuated in multiple dimensions relative to the arm socket element.

Figure 7:
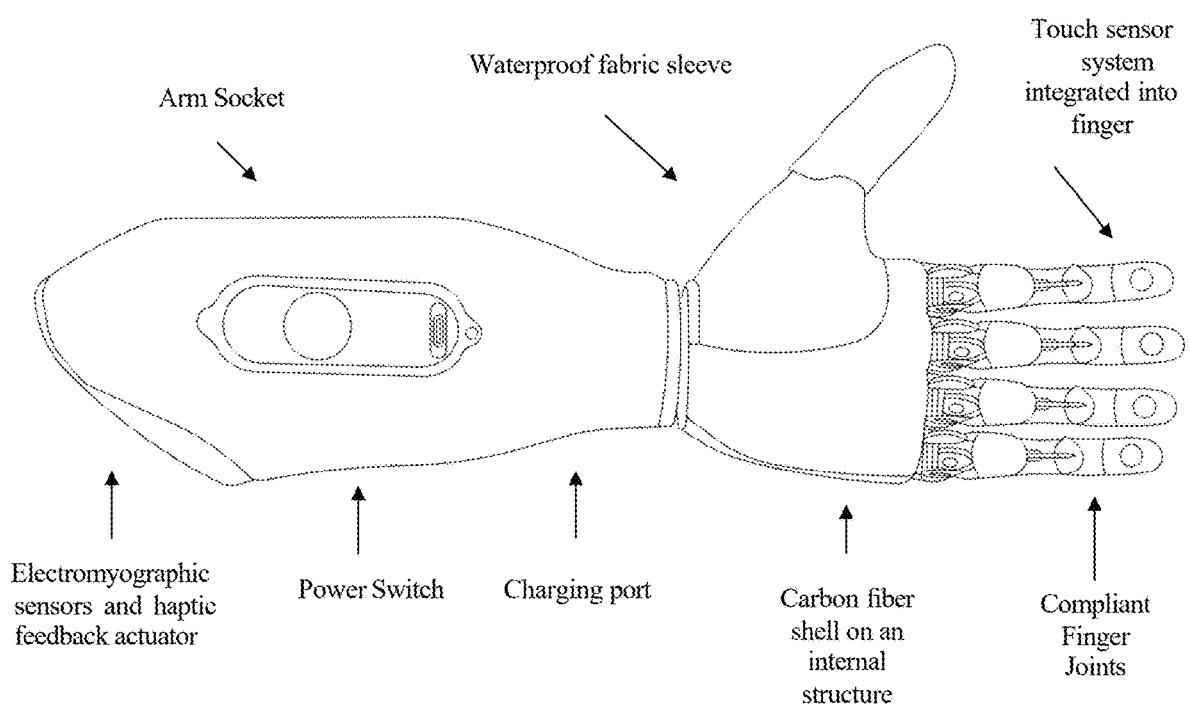
FIG. 7 is a model example of a system of a preferred embodiment.
Figure 8:
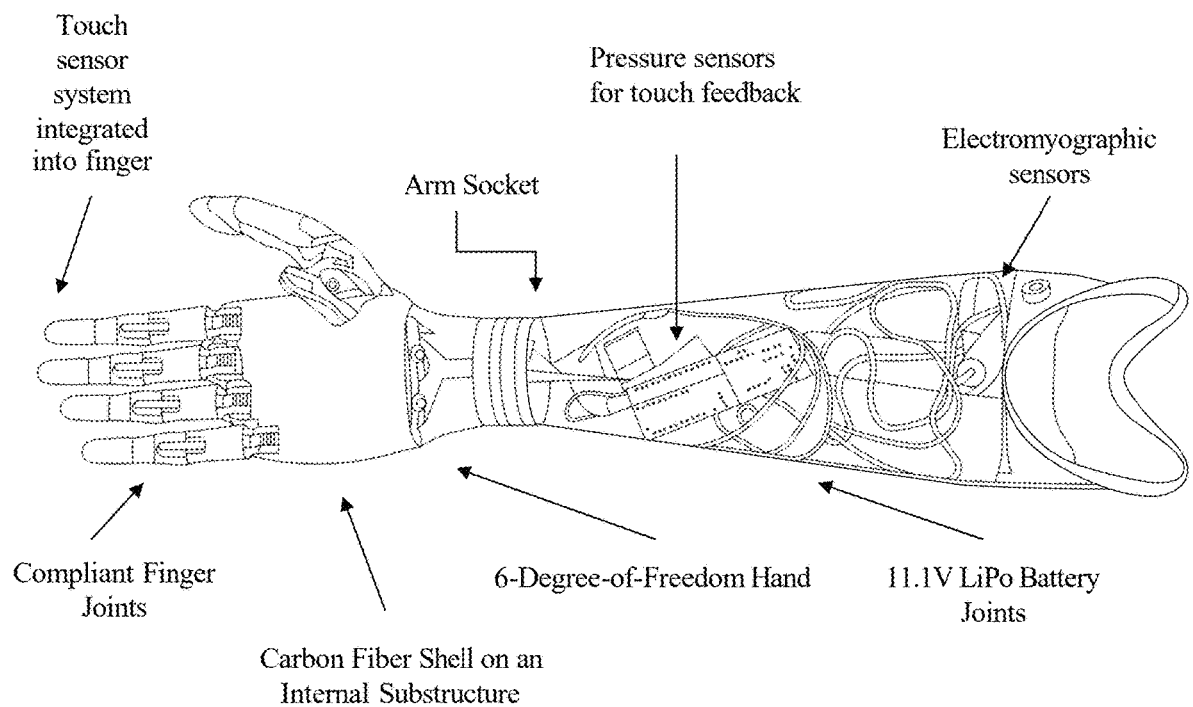
FIG. 8 is a model example of a system of a preferred embodiment.

The sleeve 130 may include control inputs to sense or detect user input to control the prosthetic hand, as shown in the model example FIGS. 7 & 8. The control inputs preferably include electromyographic sensors that are used to sense user input. A processor or digital circuit preferably translates input sensed by the electromyographic sensors into control inputs for the prosthetic hand.

Electronics, circuitry, and/or other computational system elements used in control of the prosthetic hand as well as other electronic elements such as a battery and communication modules can be contained within the sleeve 130. Alternatively, such elements may be housed in any suitable portion of the system such as the palm 110. In some variations, a portion of such elements may even be communicatively coupled through a wired or wireless connection.

The sensor system 140 of a preferred embodiment functions to receive and coordinate sensory input from sensors on the prosthetic hand. The sensor system 140 comprises sensors positioned on the prosthetic hand. More specifically, the sensor system 140 comprises sensors 142 integrated on a subset of the set of actuating digits 120. The sensor system 140 may further include a processor unit, to control sensor activity and coordinate sensor information; and wiring connecting components of the sensor system 140 and external components.

Figure 9:
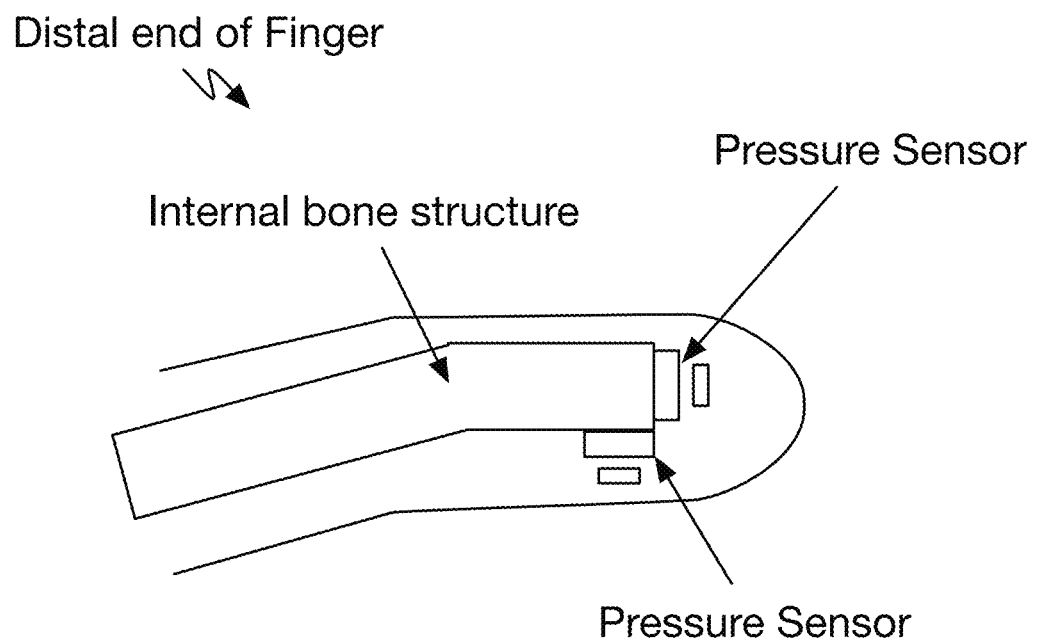
FIG. 9 is a schematic representation of a sensor system of an actuating digit.

Sensors 142 from the sensor system 140 preferably include touch sensors. The touch sensors function to provide pressure sensing capabilities to the system. As shown in FIG. 9 touch sensors may include a pressure sensor subsystem integrated on a subset of the set of actuating digits 120. Touch sensors may additionally be integrated into the palm body or into any suitable region of the system, e.g. the sleeve 130. In some variations, the pressure sensor subsystem comprises one, or a plurality, of touch sensors embedded on, in the silicone overmolding of the actuating digits 122. Depending on the desired implementation, there may be any desired number and distribution of touch sensors on, or along, any number of actuating digits 122.

In a first variation, the subset of actuating digits that have touch sensors is the entire set of actuating digits 120, thus each actuating digit 122 contains at least one touch sensor. In a first example of the first variation, each actuating digit 122 has a touch sensor below, but near the tip of the finger. In a second example, each actuating digit 122 has a touch sensor on the tip of each finger and near the pad of each finger. In a third example, each actuating digit 122 has four touch sensors; one on each face of the finger. The four touch sensors may be positioned on the distal phalanges of the actuating digit 122 with one on and substantially parallel to the surface of: the pad of the finger, a first adjacent side of the finger, a second adjacent side of the finger, and the tip of the finger. In a fourth example, the outside fingers (i.e. thumb and pinky), have touch sensors on the three exposed sides, wherein the three interior fingers (i.e. index, middle, and ring) have touch sensors integrated only on the top and the bottom. In a fifth example, the thumb digit has multiple touch sensors (e.g. four), wherein all other fingers only have one. In a sixth example, each actuating digit 122 has a touch sensor on, or near, the tip of the finger, and a touch sensor on, or near, the pad of the finger. Additionally, the index finger has two touch sensors on the radial lateral side; the pinky has two touch sensors on the ulnar lateral side; and the thumb, middle, and ring finger each have two touch sensors, one on each lateral side distally. In a seventh example, all five actuating digits 122 have six touch sensors: one touch sensor on, or near, the tip of the finger, one touch sensor on, or near, the pad of the finger, two touch sensors on the radial lateral side of the finger, and two touch sensors on the radial ulnar side of the finger. Other suitable implementations of sensor positioning may alternatively be used.

In a second variation, the subset of actuating digits that have touch sensors includes only the first (i.e. thumb), fourth (i.e. ring), and fifth (i.e. pinky) fingers. In a first example of the second variation, each actuating digit 122 has a touch sensor below, but near the tip of the finger. In a second example, each actuating digit 122 has a touch sensor on the tip of each finger and near the pad of each finger. In a third example, each actuating digit 122 has four touch sensors; one on each face of the finger. In a fourth example, the outside fingers (i.e. thumb and pinky), have touch sensors on the three exposed sides, wherein the three interior fingers (i.e. index, middle, and ring) have touch sensors integrated only on the top and the bottom. In a fifth example, the thumb digit has multiple touch sensors (e.g. four), wherein all other fingers only have one.

In a third variation, the subset of actuating digits comprises the thumb digit. In a first example of the third variation, the touch sensors comprise a single touch sensor on the pad of the thumb. In a second example, the touch sensors comprise a plurality of touch sensors on all sides of the thumb.

The sensors 132 may be any desired type, or combination of types, of sensors. In one variation, the sensors 132 are barometric pressure sensors. In a second variation, the sensors 132 are force sensitive sensors (also referred to as force sensitive resistors). In a third variation, the sensors are Hall effect sensors. In some variations, the sensor system may include non-pressure dependent sensors. For example, in one variation the sensors also include infrared (IR) sensors. IR sensors may help in controlling the functionality of the prosthetic hand.

Figure 10:
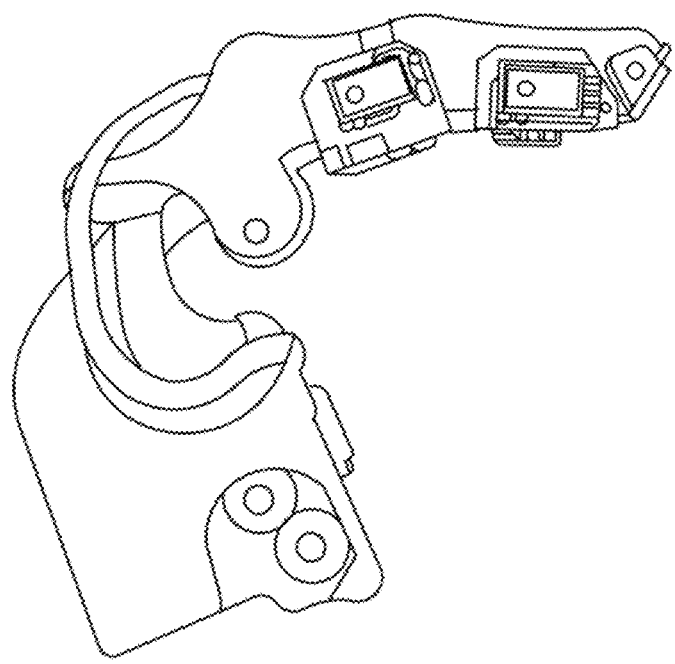
FIG. 10 is a model example of a sensor system of an actuating digit.

In one variation, the pressure sensor subsystem may include barometric pressure sensors. As shown in FIG. 10, the barometric pressure sensors are MEMS sensors on an integrated chip placed on the "bone" structure of the actuating digit 122 and encased in silicone molding. The barometric pressure sensor may be a resistive or a piezoelectric pressure sensor, wherein the barometric pressure sensor measures the pressure by measuring the degree of deformation of a membrane component of the sensor.

In a second variation, the pressure sensor subsystem may include force sensitive sensors. The force sensitive sensor may also be placed on the "bone" structure of the actuating digit 122 and encased in silicone molding or it may be placed directly on the outside surface of the actuating digits 122. The force sensitive sensor may determine force by measuring resistance change in a material due to stress.

In some variations the pressure sensor subsystem includes a Hall effect sensor and a magnet positioned within the molding of the digit. Preferably, the Hall effect sensor and the magnet are encased within silicone molding at the distal end of a digit. The Hall effect sensor is preferably displaced and aligned with the magnet. Contact, pressure, and/or any suitable deformations that happen to the silicone molding are translated into changes in the sensed magnetic field because of changing relative arrangement of the Hall effect sensor and the magnet.

In one preferred variation, two Hall effect sensors with differing orientations can be used. Similarly, two magnets may be used wherein one magnet may be oriented and aligned primarily for sensing by a first Hall effect sensor and a second magnet oriented and aligned for sensing by a second Hall effect sensor. Preferably, the two Hall effect sensors are aligned along perpendicularly defined axes. In one preferred implementation, a magnet may be oriented within the fingerpad of the silicone portion of the digit, which primarily functions to sense pressure forces applied through contact along the fingerpad; and a second magnet may be oriented at the fingertip, which functions to sense pressure forces applied on the tips of the finger. Additional or alternatively arranged Hall effect pressure sensors may be used. Additionally, alternative pressure sensors or contact sensing subsystems may be used including strain-gauges, barometric pressure sensors, piezoelectric pressure sensors, and/or any suitable type of sensor such as an optical sensor and the like.

Dependent on system implementation and type of implemented sensors, the sensor system 130 may make pressure measurements that are graded or binary. That is, in some variations the pressure sensors can determine if there is a pressure exerted on the sensor or not, and in other variations the pressure sensor may also determine the actual pressure exerted on the sensor. In one implementation, sensors may measure pressures between 50-115 kPa. In another implementation, graded sensor values are only measured, or acknowledged, once the sensor returns a pressure greater than a certain threshold (e.g. the pressure measurement is above 1.5% of the full range).

In some variations, the sensor system 140 may include a processor unit. Alternatively, the sensor system 140 may not have a processor unit. The processor unit functions to control which sensors 142 are active, and to coordinate signals from the sensors to the feedback system. The processor unit may be located in the sleeve. The processor unit control system may be implemented through an electronic circuit and/or a processor-controlled system preferably receives an input signal from the pressure sensors (e.g., as analog or digital signal) and outputs a touch feedback signal that is communicated to a touch feedback system.

The pressure sensor is preferably conductively coupled to the electronics controlling the hand through a cable that is routed internally within the actuating digit 122. The cable can be a waterproof cable rated for fluid exposure. Additionally, the cable is preferably highly durable and has a high flex tolerance. In one implementation, the wiring includes 3M high flex cables. In preferred variations, the wiring is installed such that the wiring does not include any large bends in the cable.

In some variations, the sensor system 140 is integrated with motor components of the prosthetic hand (e.g. the motors that actuate the compliant finger of the hand). Integration with the motors may enable "reflex" type interaction with the motors, enabling direct automated control of the motors through sensor interaction. That is the sensory system 140 may provide a direct motor feedback response to alter the current activity of the motors. In one example, direct sensor stimulus on the fingers may suggest that the fingers have touched an unyielding boundary and cause the prosthetic hand to stop contracting. In an opposite example, the specific activity of specific gripping fingers may suggest that there is something to be held in the prosthetic hand. Through reflex feedback from the sensor system, this may lead to an automatic contraction of the hand.

The system of a preferred embodiment includes a feedback system 150. The feedback system 150 functions by receiving sensor information from the sensor system and generating physically sensed output to the user. Feedback may be any type of desired feedback, e.g. auditory (e.g. alarm), haptic, visual, or any combination of physically sensed outputs.

Haptic feedback may include electrical stimulation and/or vibrational feedback. In one preferred variation, the feedback system 150 includes one or a plurality of stimulation nodes that can stimulate skin in contact with the stimulation nodes. When the user touches an object, the skin is stimulated electrically, feeling like a tingling, vibration, or even pressure. In another variation, the feedback system 150 includes a bio-interface for stimulation or activation of a bio-integrated system. Any suitable type of touch feedback system may be additionally or alternatively used.

In one alternative variation, the feedback system 150 outputs sensed data that can be interpreted by another system. In one variation, this may be used by a smart device like a smartphone or smart wearable (e.g., watch or glasses) to perform any suitable task such as storing information, outputting information, triggering user interactions or outputs, or providing its own form of feedback.

As an example preferred implementation, the feedback system 150 may comprise simulation nodes as a multi-channel electrical stimulator (e.g. 8-channel stimulator). The stimulation nodes comprise electrodes placed on the distinct regions of skin of the user. The electrodes may be positioned anywhere along the user's body as desired, but may preferably be positioned in the prosthetic hand sleeve, making direct contact with the residual limb of the user. In a first implementation, the electrodes may comprise sticky electrodes positioned and adhered to place on the user. In a second implementation, the electrodes comprise hybrid wet-dry electrodes.

As part of the multi-channel stimulator, the feedback system takes generated output from the sensory system 140 and converts the output into pulses of electricity to the user. In preferred variations, the feedback system 150 generates a signal that is a temporal and/or spatial mapping of the current active sensors 142 and the magnitude of the pressure exerted on them.

The set of water sealing elements are preferably used in creating water resistant or more preferably waterproof seals on the fluid ingress points of the system. In one preferred implementation, water seals are made along isolated elements such that the hand can be partially disassembled for maintenance, part changes, and/or part repairs. A variety of sealing techniques may be used in various elements of the prosthetic hand.

In a multibody base palm 110, wherein two or more palm elements are attached together, a water seal is preferably provided along the seams of the attached body elements. For example, the set of water sealing elements can include a water seal between two attached halves of the palm body 110, sealing together each multibody actuating digit 122, and/or sealing together a multibody sleeve 130. The seal can be a silicone sealant applied between the interfaces of two different elements (e.g. palm top and palm bottom). Additionally, the sealant may be a silicone gasket between multibody components and/or along connecting interfaces.

The set of water sealing elements may include a seal along the proximal end of the palm 110 (e.g., the base of the palm near the wrist region). The proximal end of the palm 110 can be where the standard connector is positioned, and the seal can seal that element. A silicone sealant or another suitable sealing material can similarly be applied in the region of the interface at the distal end of the palm 110.

The set of water sealing elements can include sealing of individual digit drive train cases. The digit drive train cases are preferably sealed internally and sealed along the connection interface with the palm 110. The digit drive train cases may include a design where the output of the drive train case has finger interface elements extending out of the sides of the case, which functions to minimize fluid-ingress areas for the drive train case. The finger interface elements preferably extend from an output shaft of the drive train, and the drive train can include waterproofed ball bearings. Accordingly, there will preferably be no openings to the internal gears of the drive train. The drive train case can then sit in a central region of the proximal end of a digit and attach to the digit with the outside finger interface elements. An O-ring or other suitable type of gasket may be used to seal the interface between the drive train case and the palm body. A sealant may additionally or alternatively be used. Additionally, the digits may have a conformal sealant coating to reduce fluid-ingress.

The set of water sealing elements can additionally include sealing of the pressure sensors for each digit. A finger sensor seal isolates the pressure sensor elements from exposure to contacted fluid. The finger sensor seal is preferably a conformal coating around the sensor element. Electrical cables connecting to the sensor are preferably waterproof rated and may be sealed in regions near a connection interface, but may be exposed in regions with fluid exposure.

The set of water sealing elements can additionally include a thumb sealing system. As mentioned above, the thumb may include two degrees of freedom, which can create a unique connection interface between the thumb and the palm when compared to the other digits and the palm. A flexible sleeve can be used to create a flexible and waterproof covering that bridges exposed gaps between the palm body and the thumb. In one preferred variation, the water sealing elements for the thumb can include a waterproof fabric waterproof-stitched and attached to a groove in the palms 110 with a waterproof silicone sealant. On the other end, the fabric connects along an O-ring, gasket, or other suitable sealed interface with the thumb digit element. The fabric is preferably made of waterproof ripstop fabric though any suitable type of waterproof material may be used. In one alternative implementation, a waterproof sleeve may additionally be used for each digit with the shape and form of the sleeve accommodating the size and design of each digit.

3. Method

As shown in FIG. 11, a method for a high precision prosthetic hand component includes: printing a negative mold S110, comprising a 3D-printed negative mold of the prosthetic hand component; from the negative mold, casting an intermediary mold S120; from the intermediary mold, creating a production mold S130; from the production mold, shaping the prosthetic hand component from a base material S140; and finishing the prosthetic hand component S150. The method functions as a multi-stage high precision heat resistant molding process in manufacturing a prosthetic hand component (e.g. a prosthetic palm, or prosthetic finger). The method may be incorporated partially, in entirety, or multiple times, to create prosthetic component parts, prosthetic components, and more generally, to create a prosthetic hand.

The method is preferably used in creating the prosthetic components as discussed above, but may be generally applied to manufacturing any general silicone based and/or carbon-fiber layered 3D component. The method may be particularly invaluable for the production of carbon-fiber layered components, wherein the method leverages a multi-stage molding process for a high precision shaping of prepreg carbon-fiber.

In one preferred variation, as shown in FIGS. 12-16 (for only one palm component), the method may be applied to creating two palm body elements that are then attached together, wherein both palm body elements have adhered carbon-fiber shells. A method variation for manufacturing a carbon-fiber reinforced prosthetic component can include printing a negative mold S110, comprising a 3D-printed negative mold of the prosthetic hand component; from the negative mold, casting an intermediary mold S120; from the intermediary mold, creating a production mold S130; from the production mold, shaping the prosthetic hand component from a base material S140 by applying prepreg carbon-fiber to the production mold and curing the prepreg carbon-fiber; finishing the prosthetic hand component S150; and trimming excess material from the prosthetic component.

Figure 17:
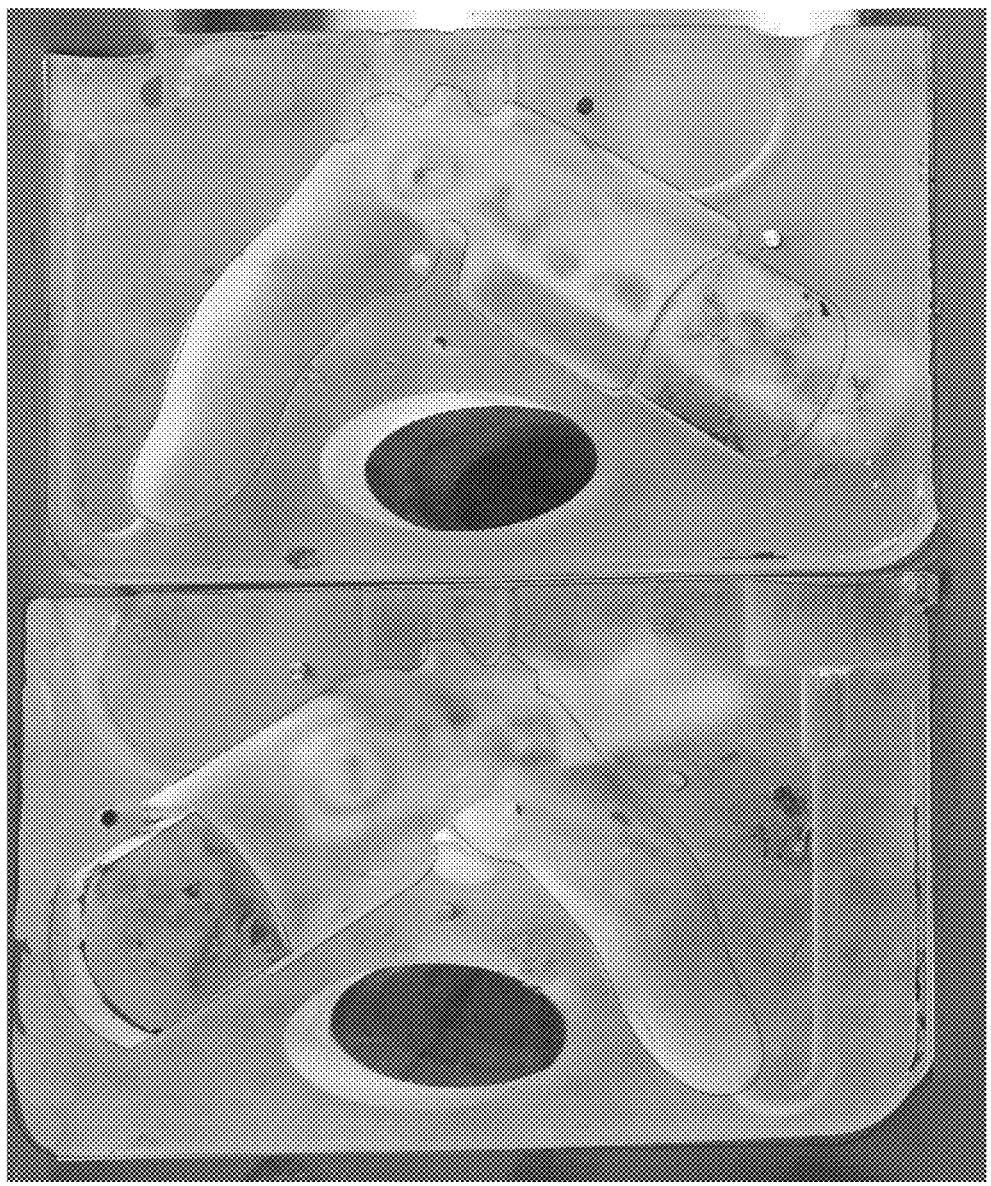
FIG. 17 is a photographic representation of a 3D printed negative mold.
Figure 18:
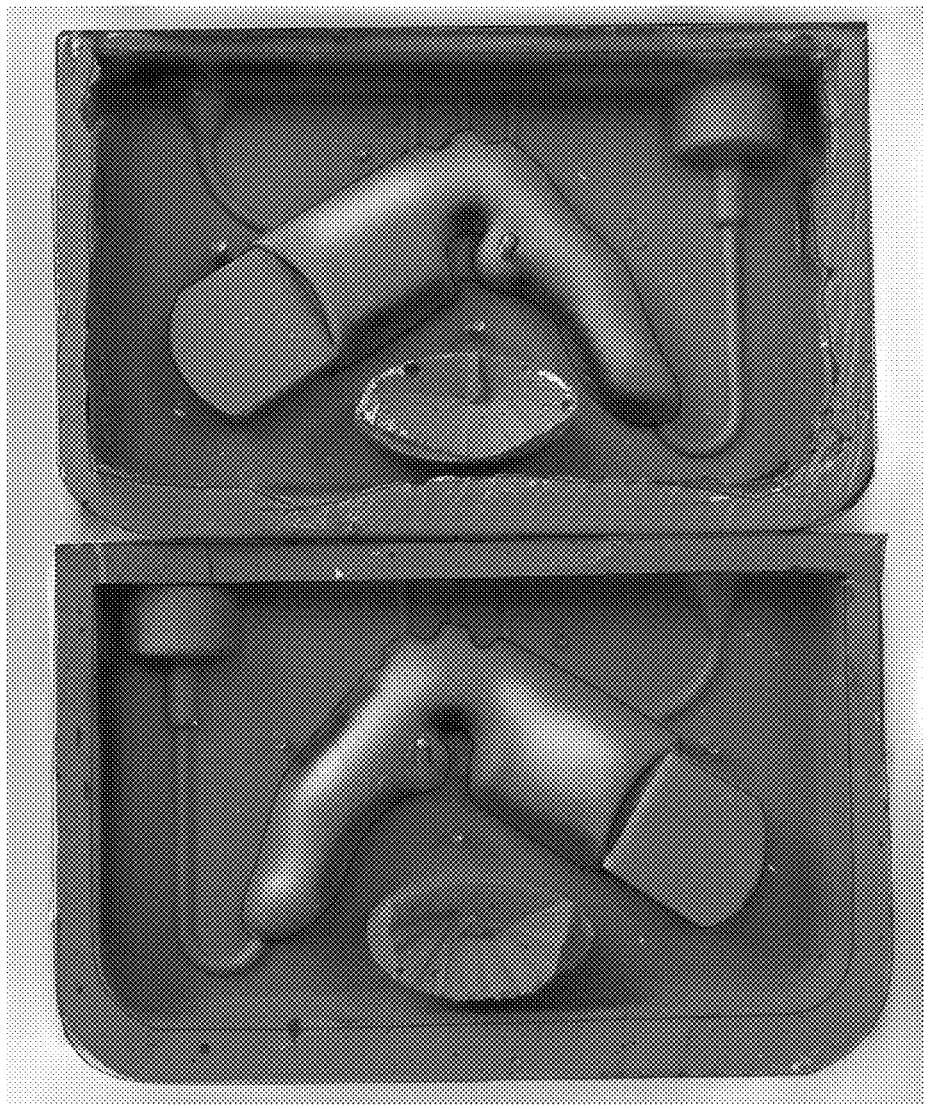
FIG. 18 is a photographic representation of an intermediary mold.
Figure 19:
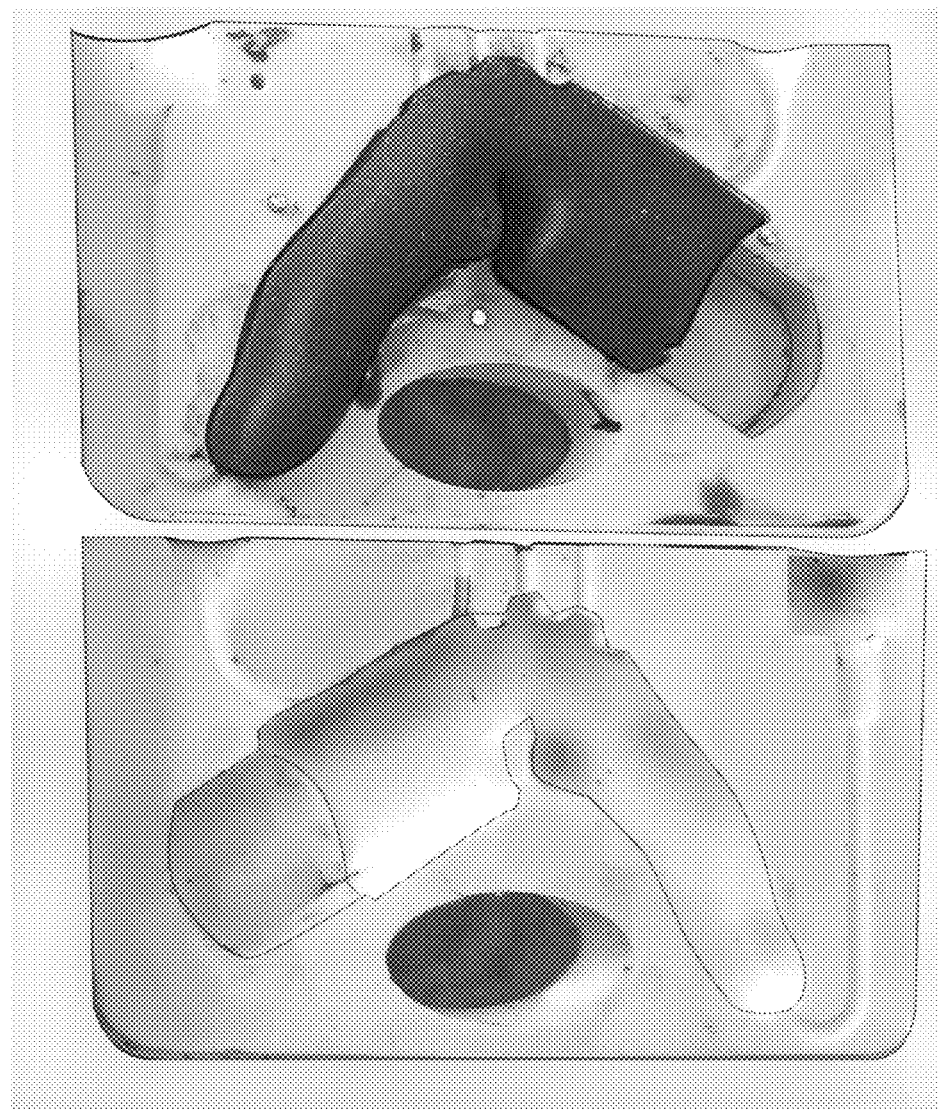
FIG. 19 is a photographic representation of a production mold.

In another preferred variation, as shown in FIGS. 17-19, the method may be applied in creating prosthetic finger components and further a prosthetic finger having a silicone outer layer. The two prosthetic finger components may be annealed together to create an actuating prosthetic finger, which is then overmolded with silicone. A method variation for manufacturing silicone encased actuating fingers can include printing a negative mold S110, comprising a 3D-printed negative mold of the prosthetic hand component; from the negative mold, casting an intermediary mold S120; from the intermediary mold, creating a production mold S130; from the production mold, shaping the prosthetic hand component from a base material S140 by clamping a finger bone (e.g. internal support structure such as a compliant four-bar linkage) to the production mold and then overmolding the finger bone with silicone; and finishing the prosthetic hand component S150.

The method may additionally or alternatively be used or adapted for manufacturing other prosthetic components. In one preferred variation, the method may be used in creating a carbon-fiber outer shell adhered to the outside of an arm socket element.

The method is preferably used in manufacturing a prosthetic hand such as the one described above, wherein the method may be used in a process for manufacturing an advanced prosthetic hand which can include manufacturing carbon-fiber palm body elements; assembling electronic components of the prosthetic hand within the palm body; applying water sealant to the palm body elements and attaching the palm body elements; creating a set of actuated finger elements with an integrated touch sensor system; attaching a set of actuated fingers; applying sealing features at a set of ingress points; and attaching an arm socket element. Additional or alternative steps may also be used depending on the design and configuration of the hand.

Figure 12:
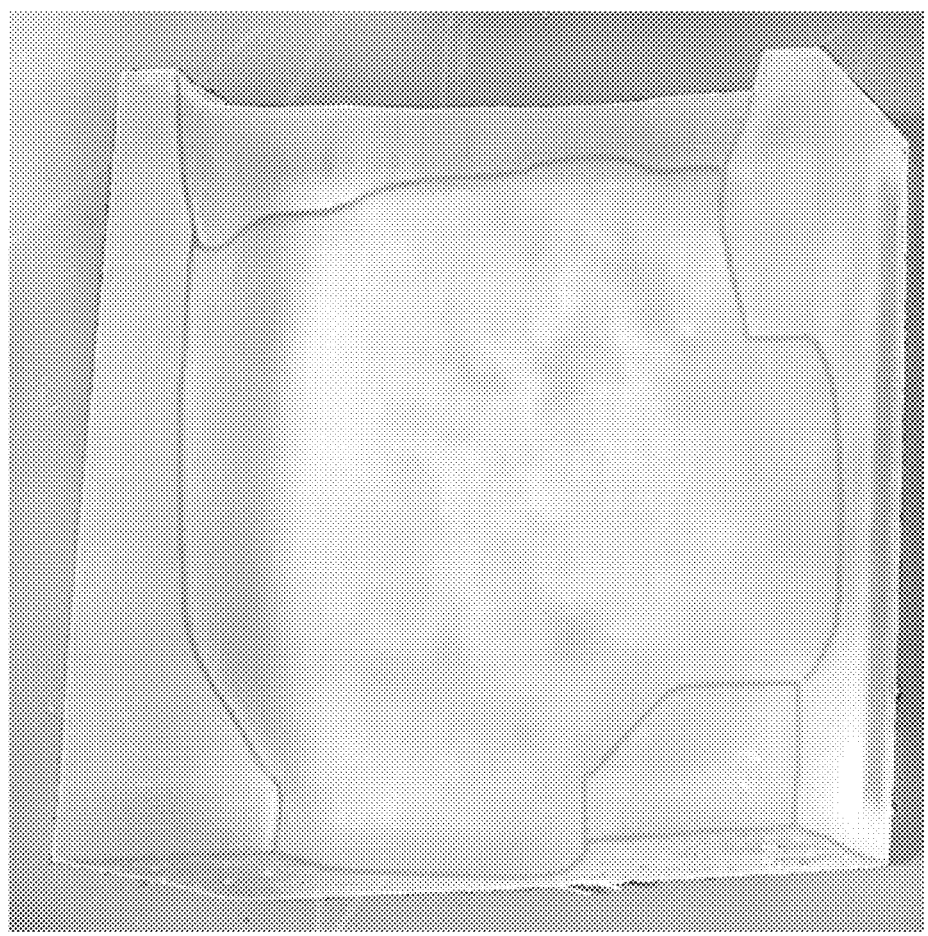
FIG. 12 is a photographic representation of a 3D printed negative mold.

Block S110, which includes printing a negative mold S110, functions to produce a three-dimensional structure that is a starting point for producing a production mold used to shape the prepreg carbon-fiber, silicone, or other material, during a curing process. The negative mold may include at least a portion with a surface shape of the negative or complementary shape of the eventual prosthetic component. For example, when producing a carbon-fiber shell for a palm body element, the 3D-printed negative mold may include a surface form that is the negative of the surface of the target end result as shown in FIG. 12 for one prosthetic palm component and FIG. 17 for the prosthetic finger.

Creating the 3D-printed negative mold preferably includes creating an SLA (stereolithography) printed negative mold, though any suitable 3D-printing process may be used. As 3D-printing is used, the size, shape, and form may be customized for a particular subject, which may be used in customizing the fit of a prosthetic component.

Creating the 3D-printed negative mold may include finishing the 3D-printed negative mold, which can include sanding and polishing. The 3D-printed mold is preferably polished to a smooth finish (e.g., smoothed to a reflective or shiny finish), which will function to imbue the resulting carbon-fiber shell with a similar finish. Alternative types of finishing or texturizing of the negative mold may be used.

Figure 13:
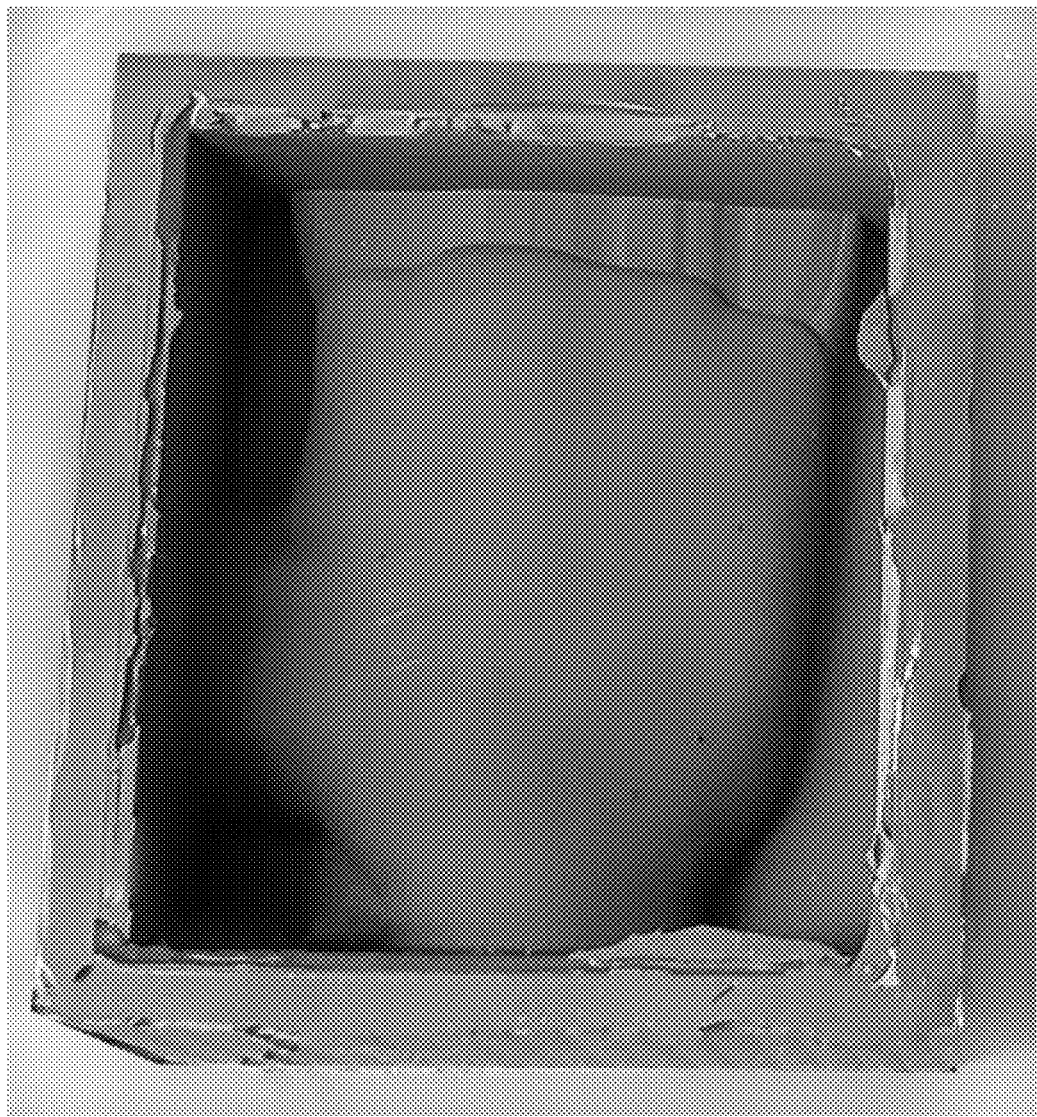
FIG. 13 is a photographic representation of an intermediary mold.

Block S120, which includes: from the negative mold, casting an intermediary mold, functions to create a molding plug. In some variations the intermediary mold may be composed of silicone. In another variation, the intermediary mold may be composed of urethane. Alternatively, the intermediary mold may be created of any desired compound. The intermediary mold can additionally function to provide an infinite resolution translation from an SLA-printed negative mold. 3D-printed molds have a resolution limit to the resulting object wherein the intermediary mold may smooth over those resolution limitations involved in 3D-printing. Creating an intermediary mold preferably includes filling the negative mold with silicone or another suitable type of material. The silicone mold will preferably be a positive mold with a shape approximating the end result. For example, the resulting silicone mold preferably has a shape similar to that of the palm body when making a palm body element as shown in FIG. 13 or similar to the desired actuating finger, as shown in FIG. 18.

Figure 14:
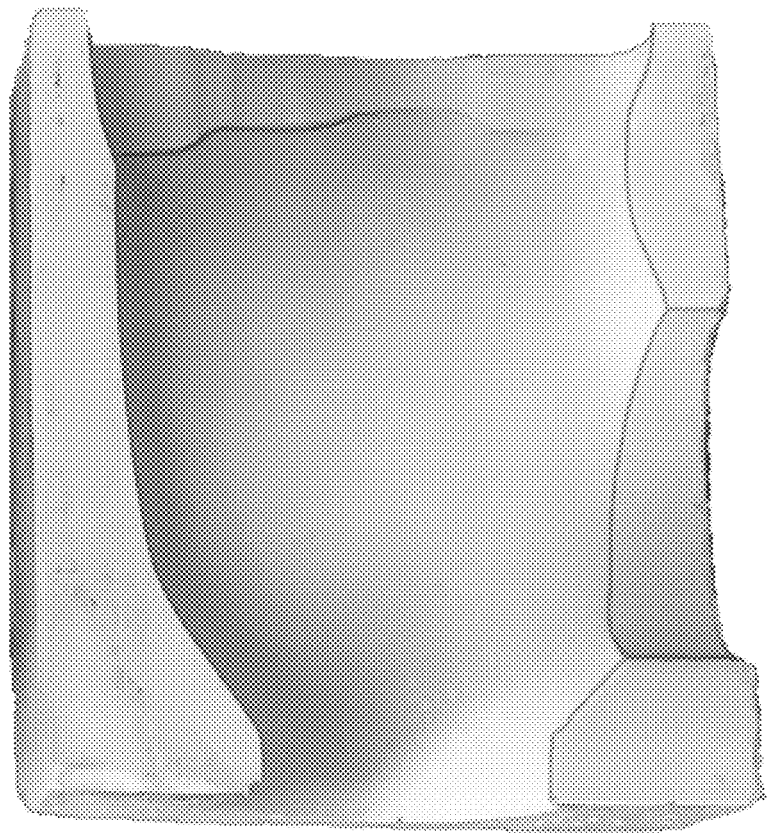
FIG. 14 is a photographic representation of a production mold.

Block S130, which includes creating a production mold from the silicone mold, functions to produce a high temperature mold. The production mold created through blocks S110, S120, and S130 can preferably be customized in shape and form through dynamic control and one-off production capabilities of 3D-printing in block S110. Additionally, unlike many 3D-printed objects, the production mold can have infinite resolution through use of the silicone mold plug and can be made of a high temperature compatible material. The production mold will be a negative mold as shown in FIG. 14 and in FIG. 19.

The production mold is preferably made from a casting resin. The casting resin or other suitable material preferably has a heat tolerance range sufficient to withstand high temperatures during the curing process. For example, the casting resin preferably has an operating temperature greater than 250° Fahrenheit. The end-use mold can preferably be reused multiple times when creating distinct components.

Creating the production mold S130 preferably includes sealing the production mold. Sealing the production mold functions in maintaining the mold and preventing damage to the mold during curing. Sealing the production mold may comprise treating the production mold with mold sealer. In some variations, multiple layers of mold sealer may be applied. Preferably, the production mold is maintained with regular sealing of the production mold after use.

Block S140, which includes shaping the prosthetic hand component from a base material, from the production mold, functions to set the shape and form of the prosthetic hand component. Shaping the prosthetic hand component S140 preferably depends on the production mold and base material.

Figure 15:
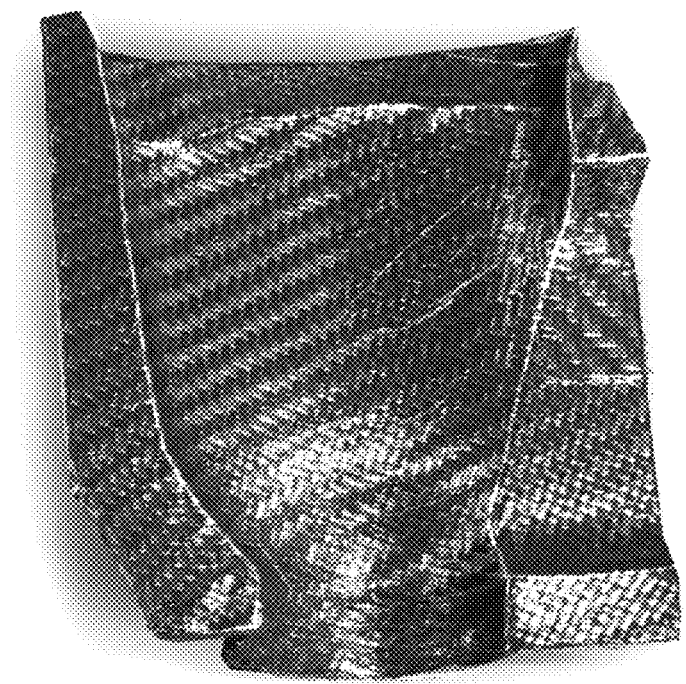
FIG. 15 is a photographic representation of a shaped prepreg-carbon fiber palm component on a production mold.

For example, shaping the palm from a prepreg carbon-fiber block S140 includes applying prepreg carbon-fiber to the production mold and curing the prepreg carbon-fiber. The carbon-fiber will preferably harden and be set to the desired shape. Applying carbon-fiber to the production mold can include attaching or pressing an uncured prepreg carbon-fiber sheet to the mold surface of the production mold, as shown in FIG. 15. The process of block S140 may include temperature treating the prepreg carbon-fiber prior to use, which can include freezing the prepreg carbon-fiber or otherwise storing the prepreg carbon-fiber in a climate-controlled environment. While prepreg carbon-fiber is preferably used, the method may alternatively include impregnating a sheet of carbon-fiber with uncured epoxy resin or another suitable material. In some variations, multiple layers of prepreg carbon-fiber base material may be implemented. Preferably prepreg carbon-fiber layers are arranged such that fibers in the carbon-fiber weave are ~0-45° from each other. This may improve material resistance and improve material compliance. The two layers of prepreg carbon-fiber may then be pressed together prior to applying them to the production mold.

Figure 16:
FIG. 16 is a photographic representation of a cured prepreg-carbon fiber palm component.

For the prepreg carbon-fiber palm, shaping the prosthetic component further includes curing the prosthetic hand component functions to harden the hand component in the desired shape. Curing the prosthetic hand component may depend on the base material used for the component. For the prepreg carbon-fiber palm component, curing the prepreg carbon-fiber may include heating to 250° F. or any suitable temperature depending on the epoxy resin used in the prepreg carbon-fiber. After completion of the curing process, the carbon-fiber can be removed as a cured carbon-fiber sheet that is hardened into the desired form as shown in FIG. 16.

In a second example for shaping a prosthetic finger component using a silicone base material, shaping the prosthetic hand component S140 comprises clamping the finger bone (e.g. internal support structure such as a compliant four-bar linkage) to the production mold and then overmolding it with silicone. Once the finger bone is locked in place, it is then overmolded with silicone. In variations, wherein sensor components are to be included on the prosthetic hand, the sensors are first fixed onto the prosthetic bone, as shown in FIG. 10, prior to the molding process. The silicone is then allowed to sit until it completely cures.

Block S150, which includes finishing the prosthetic hand component, functions to perform optional treatments on prosthetic hand components, and adhering together the prosthetic hand components (e.g. adhering the top side and bottom side of the palm or adhering the lateral sides of the prosthetic finger together).

An optional process that can be used in creating a carbon-fiber reinforced component may include trimming excess material. A CNC machine or other suitable tool may be used to trim the carbon-fiber or other materials. Edges may be sanded or smoothed. Finishing may additionally include cutting holes in designated regions. The holes can be circular drilled into the carbon-fiber where the positioning may align with screw fastening holes of an internal substructure.

Additionally, block S150 preferably includes adhering the cured carbon-fiber to an internal substructure of the prosthetic component. Adhering the cured carbon-fiber to an internal substructure functions to adhere the front and back side of the palm together and to attach the cured carbon-fiber to a frame structure. The frame structure in the case of a palm body will generally be a substantially internal component. In some variations, the carbon-fiber may be attached to a structure that is not primarily an internal structure and that has exposed surfaces in the resulting prosthetic component. Adhering the cured carbon-fiber preferably uses an epoxy, though any suitable adhesive compound may be used.

Finishing the prosthetic hand component S150 may further include post-processing. Post-processing may include sanding and polishing edges and trimming off excess material. Post processing may additionally include applying an outer coating, which may involve clear coating the carbon-fiber shell with 2*k* urethane clear coat but any suitable coating or finish may be applied.

The method may additionally include 3D-printing the internal substructure. Alternatively, an internal substructure can be produced through any suitable means such as injection molding, CNC machining, and/or other suitable manufacturing processes.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for an advanced prosthetic hand comprising:
    a base palm, comprising the primary body of the prosthetic hand;
    a set of actuating digits wherein each digit is connected to the base palm and where each actuating digit comprises:
        a bone structure, and
        malleable skin layer that is overmolded around the bone structure;
    a sleeve, connecting the prosthetic hand to a prosthetic wearer;
    a sensor system, comprising a set of sensors integrated on a subset of the set of actuating digits, wherein at least one sensor of the set of sensors is integrated into a bone structure, wherein the set of sensors comprises a set of Hall effect sensors and a set of magnets, wherein each magnet of the set of magnets is encased in the skin layer and displaced and aligned with a Hall effect sensor of the set of Hall effect sensors; and
    and a feedback system, connected to the sensor system enabling sensory feedback from the sensor system.

2. The system of claim 1, wherein each actuating digit with integrated sensors comprises an actuating digit with a plurality of integrated sensors.

3. The system of claim 2, wherein the feedback from the sensor system generates a reflex motion response.

4. The system of claim 3, wherein the reflex motion response is to stop finger contraction.

5. The system of claim 3, wherein the reflex motion response is a gripping response.

6. The system of claim 1, wherein the set of sensors further comprises a set of barometric pressure sensors.

7. The system of claim 1, wherein the feedback system comprises a plurality of electrodes.

8. The system of claim 1, wherein the sensor system is a multi-channel output sensor system that generates a multi-channel pulse feedback signal to the feedback system in response to activation of a subset of the set of sensors.

9. The system of claim 8, wherein the multi-channel pulse feedback signal identifies the activated sensor and response magnitude of all activated sensors.

10. The system of claim 9, wherein the feedback system comprises wet-dry electrodes integrated into the sleeve of the prosthetic hand.

11. The system of claim 9, wherein the feedback system comprises sticky electrodes.

12. The system of claim 1, wherein the system further comprises a set of water sealant elements.

13. The system of claim 1, wherein the set of sensors further comprises force sensitive resistors.

14. The system of claim 1, wherein the set of sensors further comprises at least one touch sensor.

15. A system for an advanced prosthetic hand comprising:
a base palm, comprising the primary body of the prosthetic hand;
a set of actuating digits wherein each digit is connected to the base palm and where each actuating digit comprises:
 a bone structure with a compliant joint region and a passively flexible distal phalanx joint, and
 malleable skin layer that is overmolded around the bone structure;
a sleeve, connecting the prosthetic hand to a prosthetic wearer;
a sensor system, comprising a set of sensors integrated on a subset of the set of actuating digits, wherein at least one sensor of the set of sensors is integrated into a bone structure near the passively flexible distal phalanx joint of at least one actuating digit, wherein the set of sensors comprises a set of Hall effect sensors and a set of magnets, wherein each magnet of the set of magnets is encased in the skin layer and displaced and aligned with a Hall effect sensor of the set of Hall effect sensors; and
a feedback system, connected to the sensor system enabling sensory feedback from the sensor system.

* * * * *